(12) United States Patent
Christiano et al.

(10) Patent No.: US 9,279,031 B2
(45) Date of Patent: Mar. 8, 2016

(54) AMINE-TERMINATED, SUBSTANTIALLY LINEAR SILOXANE COMPOUND AND EPOXY PRODUCTS MADE WITH THE SAME

(71) Applicant: Milliken & Company, Spartanburg, SC (US)

(72) Inventors: Steven P. Christiano, Spartanburg, SC (US); Olha V. Hoy, Greenville, SC (US); John G. Lever, Spartanburg, SC (US); Nathaniel O. Hayes, Inman, SC (US)

(73) Assignee: MILLIKEN & COMPANY, Spartanburg, SC (US)

( * ) Notice: Subject to any disclaimer, the term of this patent is extended or adjusted under 35 U.S.C. 154(b) by 56 days.

(21) Appl. No.: 14/218,101

(22) Filed: Mar. 18, 2014

(65) Prior Publication Data

US 2014/0296379 A1    Oct. 2, 2014

Related U.S. Application Data

(60) Provisional application No. 61/807,293, filed on Apr. 1, 2013.

(51) Int. Cl.
| | | |
|---|---|---|
| *B32B 27/38* | (2006.01) | |
| *C08G 59/14* | (2006.01) | |
| *C08G 77/388* | (2006.01) | |
| *C09D 163/00* | (2006.01) | |
| *C09D 183/08* | (2006.01) | |
| *B32B 27/28* | (2006.01) | |
| *C09D 183/06* | (2006.01) | |
| *C08G 77/26* | (2006.01) | |
| *C08G 77/38* | (2006.01) | |
| *C08G 77/00* | (2006.01) | |

(52) U.S. Cl.
CPC .......... *C08G 59/1477* (2013.01); *B32B 27/283* (2013.01); *B32B 27/38* (2013.01); *C08G 59/14* (2013.01); *C08G 77/26* (2013.01); *C08G 77/38* (2013.01); *C08G 77/80* (2013.01); *C09D 163/00* (2013.01); *C09D 183/06* (2013.01)

(58) Field of Classification Search
None
See application file for complete search history.

(56) References Cited

U.S. PATENT DOCUMENTS

| | | | |
|---|---|---|---|
| 4,847,154 A | 7/1989 | Ryang | |
| 5,384,383 A * | 1/1995 | Legrow | C07F 7/0849 528/23 |
| 5,620,485 A * | 4/1997 | Fey | B01D 19/0409 D19/409 |
| 5,959,034 A * | 9/1999 | Ogawa | C08G 18/61 525/104 |
| 6,030,919 A | 2/2000 | Lewis | |
| 8,263,687 B2 | 9/2012 | Muller-Frischinger et al. | |

FOREIGN PATENT DOCUMENTS

JP    55-160785 A  * 12/1980

OTHER PUBLICATIONS

Caseri et al., Hydrosilyiation Chemistry and Catalysis With cis-PtCl$_2$(PhCH=CH$_2$)$_2$, *Organometallics* 1988, vol. 7, No. 6, 1373-1380.

Caseri et al., Mechanistic Aspects of the Platinum Catalysed Hydrosilylation of PhCH=CH$_2$ With Et$_3$SiH, *Journal of Organometallic Chemistry*, 356 (1988) 259-269, Printed in The Netherlands.

Riffle et al., Elastomeric Polysiloxane Modifiers for Epoxy Networks, Synthesis of Functional Oligomers and Network Formation Studies, *Epoxy Resin Chemistry II*; ACS Symposium Series; American Chemical Society, Washington, DC, 1983, pp. 21-54.

Yilgör et al, Reactive Difunctional Siloxane Oligomers, Synthesis and Characterization, In: Reactive Oligomers, ACS Symposium Series, American Chemical Society, Washington, DC, 1985, pp. 161-174.

Yorkgitis, et al., Siloxane Modifiers for Epoxy Resins, In: Rubber-Modified Thermoset Resins, Advances in Chemistry, American Chemical Society, Washington, DC, 1984, pp. 137-161.

PCT/US2014/031233 International Search Report, Filing Date Mar. 19, 2014, 3 pages.

PCT/US2014/031233 International Written Opinion, Filing Date Mar. 19, 2014, 6 pages.

* cited by examiner

*Primary Examiner* — Robert Sellers

(74) *Attorney, Agent, or Firm* — Robert M. Lanning

(57) ABSTRACT

An amine-terminated, substantially linear siloxane compound comprises siloxane repeating units conforming to specified structures, one of which contains pendant aromatic groups. The amine-terminated, substantially linear siloxane compound further comprises amine-substituted terminal siloxy groups. An epoxy product is made by reacting an epoxy resin and the amine-terminated, substantially linear siloxane compound.

41 Claims, No Drawings

AMINE-TERMINATED, SUBSTANTIALLY LINEAR SILOXANE COMPOUND AND EPOXY PRODUCTS MADE WITH THE SAME

TECHNICAL FIELD OF THE INVENTION

The present application is directed to amine-terminated, substantially linear siloxane compounds and the use of such compounds in epoxy products.

BACKGROUND

Siloxane compounds are well known for their thermal stability, ability to maintain flexibility at low temperatures, and ability to impart hydrophobicity to surfaces. Therefore, it is not surprising that some have proposed incorporating siloxane compounds into epoxy systems. These solutions have been proposed as a means to reduce brittleness and increase hydrophobicity of the epoxy systems. While such solutions have been proposed, these solutions have not been without their problems. Siloxane compounds generally are not miscible in epoxy resin systems. Therefore, it is possible for a siloxane compound to phase separate from an epoxy system to which it is added. If such phase separation occurs, it can lead to defects in the cured epoxy.

A need therefore remains for siloxane compounds that are capable of reacting with epoxy resins and show improved compatibility with or solubility in a range of epoxy systems. A need also remains for epoxy products made by reacting such a siloxane compound with an epoxy resin. The invention described herein attempts to meet such needs.

BRIEF SUMMARY OF THE INVENTION

In a first embodiment, the invention provides an amine-terminated, substantially linear siloxane compound comprising a plurality of siloxane repeating units, wherein:

(a) a portion of the siloxane repeating units are independently selected from the group consisting of siloxane repeating units conforming to the structure of Formula (I)

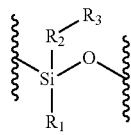

(I)

wherein $R_1$ is selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_2$ is selected from the group consisting of alkanediyl groups and alkenediyl groups; and $R_3$ is selected from the group consisting of aryl groups, substituted aryl groups, heteroaryl groups, and substituted heteroaryl groups;

(b) a portion of the siloxane repeating units are independently selected from the group consisting of siloxane repeating units conforming to the structure of Formula (V)

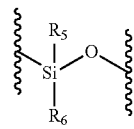

(V)

wherein $R_5$ and $R_6$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; and (c) the compound comprises terminal groups conforming to the structure of Formula (X) and Formula (XI)

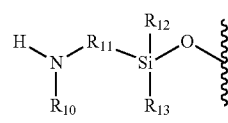

(X)

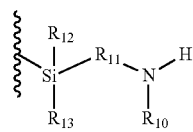

(XI)

wherein $R_{10}$ is selected from the group consisting of hydrogen, alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_{11}$ is selected from the group consisting of alkanediyl groups and substituted alkanediyl groups; $R_{12}$ and $R_{13}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups.

In a second embodiment, the invention provides a product obtained by reacting an epoxy resin and an amine-terminated, substantially linear siloxane compound, the amine-terminated, substantially linear siloxane compound comprising a plurality of siloxane repeating units, wherein:

(a) a portion of the siloxane repeating units are independently selected from the group consisting of siloxane repeating units conforming to the structure of Formula (I)

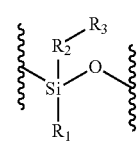

(I)

wherein $R_1$ is selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_2$ is selected from the group consisting of alkanediyl groups and alkenediyl groups; and $R_3$ is selected from the group consisting of aryl groups, substituted aryl groups, heteroaryl groups, and substituted heteroaryl groups;

(b) a portion of the siloxane repeating units are independently selected from the group consisting of siloxane repeating units conforming to the structure of Formula (V)

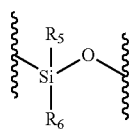

(V)

wherein $R_5$ and $R_6$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; and (c) the compound comprises terminal groups conforming to the structure of Formula (X) and Formula (XI)

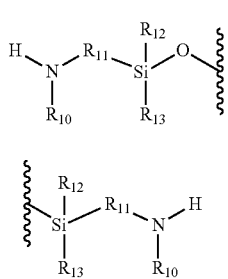

(X)

(XI)

wherein $R_{10}$ is selected from the group consisting of hydrogen, alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_{11}$ is selected from the group consisting of alkanediyl groups and substituted alkanediyl groups; $R_{12}$ and $R_{13}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups.

In a third embodiment, the invention provides a product comprising a moiety conforming to the structure of Formula (L)

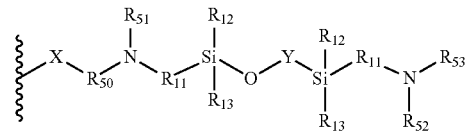

(L)

wherein X is a moiety derived from a group linking epoxide groups in an epoxy resin; $R_{11}$ is selected from the group consisting of alkanediyl groups and substituted alkanediyl groups; $R_{12}$ and $R_{13}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_{50}$ is a divalent group selected from the group consisting of —CH$_2$CH(OH)CH$_2$— and —CH$_2$CH(CH$_2$OH)—; $R_{51}$, $R_{52}$, and $R_{53}$ are independently selected from the group consisting of hydrogen, alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and —X—$R_{50}$—; Y is a substantially linear siloxane moiety comprising a plurality of siloxane repeating units wherein:

(a) a portion of the siloxane repeating units are independently selected from the group consisting of siloxane repeating units conforming to the structure of Formula (I)

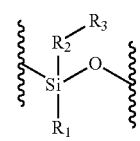

(I)

wherein $R_1$ is selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_2$ is selected from the group consisting of alkanediyl groups and alkenediyl groups; and $R_3$ is selected from the group consisting of aryl groups, substituted aryl groups, heteroaryl groups, and substituted heteroaryl groups; and (b) a portion of the siloxane repeating units are independently selected from the group consisting of siloxane repeating units conforming to the structure of Formula (V)

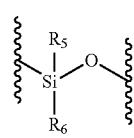

(V)

wherein $R_5$ and $R_6$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups.

DETAILED DESCRIPTION OF THE INVENTION

The following definitions are provided to define several of the terms used throughout this application.

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic unbranched and branched hydrocarbons in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom (as in an ether) or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom, a nitrogen atom, or a sulfur atom.

As used herein, the term "alkenyl groups" refers to univalent functional groups derived from acyclic, unbranched and branched olefins (i.e., hydrocarbons having one or more carbon-carbon double bonds) by removal of a hydrogen atom from a carbon atom of the olefin.

As used herein, the term "substituted alkenyl groups" refers to univalent functional groups derived from acyclic, substituted olefins by removal of a hydrogen atom from a carbon atom of the olefin. In this definition, the term "substituted olefins" refers to compounds derived from acyclic, unbranched and branched hydrocarbons having one or more carbon-carbon double bonds in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom (as in an ether) or a sulfur atom (as in a sulfide).

As used herein, the term "cycloalkenyl groups" refers to univalent functional groups derived from cyclic olefins (i.e., cyclic hydrocarbons having one or more carbon-carbon double bonds) by removal of a hydrogen atom from a carbon atom of the olefin. The carbon atoms in the cyclic olefins can be substituted with alkyl groups and/or alkenyl groups.

As used herein, the term "substituted cycloalkenyl groups" refers to univalent functional groups derived from substituted cyclic olefins by removal of a hydrogen atom from a carbon atom of the cyclic olefin. In this definition, the term "substituted cyclic olefins" refers to compounds derived from non-aromatic, monocyclic and polycyclic hydrocarbons having one or more carbon-carbon double bonds in which one or more of the hydrogen atoms of the hydrocarbon is replaced with a non-hydrogen atom (e.g., a halogen atom) or a non-alkyl functional group (e.g., hydroxy group, aryl group, heteroaryl group).

As used herein, the term "heterocyclyl groups" refers to univalent functional groups derived from heterocyclic compounds by removal of a hydrogen atom from an atom in the cyclic portion of the heterocyclic compound. In this definition, the term "heterocyclic compounds" refers to compounds derived from non-aromatic, monocyclic and polycyclic compounds having a ring structure composed of atoms of at least two different elements. These heterocyclic compounds can also comprise one or more double bonds.

As used herein, the term "substituted heterocyclyl groups" refers to univalent functional groups derived from substituted heterocyclic compounds by removal of a hydrogen atom from an atom in the cyclic portion of the compound. In this definition, the term "substituted heterocyclic compounds" refers to compounds derived from non-aromatic, monocyclic and polycyclic compounds having a ring structure composed of atoms of at least two different elements where one or more of the hydrogen atoms of the cyclic compound is replaced with a non-hydrogen atom (e.g., a halogen atom) or a functional group (e.g., hydroxy group, alkyl group, aryl group, heteroaryl group). These substituted heterocyclic compounds can also comprise one or more double bonds.

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., hydroxy group).

As used herein, the term "substituted heteroaryl groups" refers to univalent functional groups derived from substituted heteroarenes by removal of a hydrogen atom from a ring carbon atom. In this definition, the term "substituted arenes" refers to compounds derived from monocyclic and polycyclic aromatic hydrocarbons in which (1) one or more of the hydrogen atoms of the hydrocarbon is replaced with a non-hydrogen atom (e.g., a halogen atom) or a non-alkyl functional group (e.g., hydroxy group) and (2) at least one methine group (—C=) of the hydrocarbon is replaced by a trivalent heteroatom and/or at least one vinylidene group (—CH=CH—) of the hydrocarbon is replaced by a divalent heteroatom.

As used herein, the term "alkanediyl groups" refers to divalent functional groups derived from alkanes by removal of two hydrogen atoms from the alkane. These hydrogen atoms can be removed from the same carbon atom on the alkane (as in ethane-1,1-diyl) or from different carbon atoms (as in ethane-1,2-diyl).

As used herein, the term "substituted alkanediyl groups" refers to divalent functional groups derived from substituted alkanes by removal of two hydrogen atoms from the alkane. These hydrogen atoms can be removed from the same carbon atom on the substituted alkane (as in 2-fluoroethane-1,1-diyl) or from different carbon atoms (as in 1-fluoroethane-1,2-diyl). In this definition, the term "substituted alkanes" has the same meaning as set forth above in the definition of substituted alkyl groups.

As used herein, the term "alkenediyl groups" refers to divalent functional groups derived from acyclic, unbranched and branched olefins (i.e., hydrocarbons having one or more carbon-carbon double bonds) by removal of two hydrogen atoms from the olefin. These hydrogen atoms can be removed from the same carbon atom on the olefin (as in but-2-ene-1, 1-diyl) or from different carbon atoms (as in but-2-ene-1,4-diyl).

In a first embodiment, the invention provides an amine-terminated, substantially linear siloxane compound. As used in reference to this siloxane compound, the "term substantially linear" means that the siloxane compound has a siloxane backbone comprised mostly of M units (such as those conforming to the structures of Formula (X) and (XI) below) and D units (such as those conforming to the structure of Formula (I) and (V) below). Accordingly, the siloxane compound has very few, if any, T units and/or Q units that constitute branch points in the siloxane compound. The presence of T units and/or Q units allows for the formation of connections between chains and can lead to the formation of extended, branched siloxane structures of high molecular weight and potentially the formation of crosslinked gels which are highly undesirable for use in forming modified epoxy systems and are particularly problematic in epoxy coatings. Preferably, the term "substantially linear" means that the siloxane compound contains only those T units and/or Q units that can randomly occur (i.e., the T units and/or Q units are not intentionally added) when a MD siloxane compound is formed, which those familiar with the art understand is very few T units and/or Q units. More specifically, a population of molecules of the amine-terminated, substantially linear siloxane compound preferably contains, on average, less than about 3 mol. % of T units and Q units per molecule. More preferably, the population of molecules preferably contains, on average, less than about 2.5 mol. %, less than about 2 mol. %, less than about 1.5 mol. %, less than about 1 mol. %, less than about 0.9 mol. %, less than about 0.8 mol. %, less than about 0.7 mol. %, less than about 0.6 mol. %, less than about 0.5 mol. %, less than about 0.4 mol. %, less than about 0.3 mol. %, less than about 0.2 mol. %, less than about 0.1 mol. %, or less than about 0.05 mol. % T units and Q units per molecule. The mol. % of T units and Q units in the compound can be determined using $^{29}$Si Nuclear Magnetic Resonance spectroscopy using techniques known to those familiar with the art.

The amine-terminated, substantially linear siloxane compound comprises a plurality of siloxane repeating units. The siloxane compound can comprise any suitable combination of siloxane repeating units. Preferably, a portion of the siloxane repeating units are independently selected from the group consisting of siloxane repeating units conforming to the structure of Formula (I)

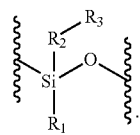

(I)

In the structure of Formula (I), $R_1$ is selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups. $R_2$ is selected from the group consisting of alkanediyl groups and alkenediyl groups; and $R_3$ is selected from the group consisting of aryl groups, substituted aryl groups, heteroaryl groups, and substituted heteroaryl groups. In the structure of Formula (I) and the structures that follow, the partial bonds (i.e., the bonds truncated by the wavy line) represent bonds through to adjacent moieties or repeating units.

As can be seen from the above discussion, the pendant aryl or heteroaryl groups on the siloxane repeating units conforming to the structure of Formula (I) are attached through an intervening alkanediyl or alkenediyl group. While not wishing to be bound to any particular theory, it is believed that attaching these groups to the siloxane moiety in this manner avoids some of the problems associated with aryl groups directed attached to the silicon atom in the siloxane moiety. For example, siloxane compounds containing an aryl group directly attached to the silicon atom are costly to produce and their supply is limited. Further, these substitutions (i.e., the substitution in which the aryl group is directly attached to the silicon atom) are typically achieved using reactants that contain or can produce trace amounts of polychlorinated biphenyls (PCBs). Even though only trace amounts of such PCBs are present in the materials, Applicants believe that the substitution specified by Formula (I) is beneficial because it can be produced using reactants and in a manner that avoids the production of PCBs.

In a preferred embodiment, $R_1$ is selected from the group consisting of alkyl groups, preferably $C_1$-$C_{30}$ alkyl groups and more preferably $C_1$-$C_8$ alkyl groups. In a particularly preferred embodiment, $R_1$ is a methyl group.

In a preferred embodiment, $R_2$ is selected from the group consisting of $C_1$-$C_{30}$ alkanediyl groups and $C_1$-$C_{30}$ alkenediyl groups, more preferably $C_1$-$C_8$ alkanediyl groups and $C_1$-$C_8$ alkenediyl groups. More preferably, $R_2$ is a $C_1$-$C_{30}$ alkanediyl group, most preferably a $C_1$-$C_8$ alkanediyl group. In a particularly preferred embodiment, $R_2$ is 2-methyl-ethane-1,2-diyl.

In a preferred embodiment, $R_3$ is selected from the group consisting of aryl groups, preferably $C_6$-$C_{10}$ aryl groups. In a particularly preferred embodiment, $R_3$ is phenyl.

The siloxane repeating units present in the first portion possess the same basic structure (i.e., a structure conforming to Formula (I)), but all of the repeating units are not necessarily substituted with the same groups. In other words, the siloxane compound can contain siloxane repeating units conforming to the structure of Formula (I) that differ in the selection of the $R_1$, $R_2$, and $R_3$. However, in certain preferred embodiments, the substituents $R_1$, $R_2$, and $R_3$ are the same for all of the siloxane repeating units conforming to the structure of Formula (I).

The siloxane repeating units conforming to the structure of Formula (I) can constitute any suitable amount of the siloxane repeating units in the amine-terminated, substantially linear siloxane compound. While not wishing to be bound to any particular theory, it is believed that the siloxane repeating units conforming to the structure of Formula (I), which have a pendant aromatic ring, help to make the amine-terminated, substantially linear siloxane compound more compatible with or soluble in epoxy resin systems. This improved compatibility with or solubility in epoxy resin systems minimizes or eliminates phase separation between the epoxy resin and the amine-terminated, substantially linear siloxane compound. As understood by those familiar with the art, phase separation between components in the epoxy resin system can negatively affect reactivity and curing or the resin and can also create flaws in the coating. Thus, in order bring about this improved compatibility and solubility, the siloxane repeating units conforming to Formula (I) preferably constitute an appreciable amount of the siloxane repeating units in the compound. Preferably, the siloxane repeating units conforming to the structure of Formula (I) comprise about 1% or more, more preferably about 5% or more, of the siloxane repeating units in the amine-terminated, substantially linear siloxane compound. The amount of the siloxane repeating units conforming to the structure of Formula (I) can alternatively be expressed in terms of the percentage of the siloxane compound's molecular weight that these specific repeating units constitute. More preferably, the siloxane repeating units conforming to the structure of Formula (I) in the amine-terminated, substantially linear siloxane compound comprise about 15% or more, more preferably about 20% or more, of the molecular weight of the amine-terminated, substantially linear siloxane compound. While it is preferred for the siloxane compound to comprise an appreciable amount of siloxane repeating units conforming to the structure of Formula (I), it is believed that there are upper limits to the amount of such repeating units that are desirable for the compound. Thus, the siloxane repeating units conforming to the structure of Formula (I) in the amine-terminated, substantially linear siloxane compound preferably comprise about 60% or less, more preferably about 50% or less, of the molecular weight of the amine-terminated, substantially linear siloxane compound. Accordingly, in one specific preferred embodiment, the siloxane repeating units conforming to the structure of Formula (I) in the amine-terminated, substantially linear siloxane compound comprise about 15% to about 50% of the molecular weight of the amine-terminated, substantially linear siloxane compound.

The amine-terminated, substantially linear siloxane compound comprises additional siloxane repeating units. Preferably, a portion of the siloxane repeating units in the amine-terminated, substantially linear siloxane compound are independently selected from the group consisting of siloxane repeating units conforming to the structure of Formula (V)

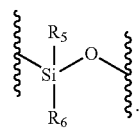

(V)

In the structure of Formula (V), $R_5$ and $R_6$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups. In a preferred embodiment, $R_5$ and $R_6$ are independently selected from the group consisting of alkyl groups, preferably $C_1$-$C_{30}$ alkyl groups and more preferably $C_1$-$C_8$ alkyl groups. In a particularly preferred embodiment, $R_5$ and $R_6$ are methyl groups.

In a preferred embodiment, $R_5$ and $R_6$ are independently selected from the group consisting of alkyl groups, preferably $C_1$-$C_{30}$ alkyl groups and more preferably $C_1$-$C_8$ alkyl groups. In a particularly preferred embodiment, $R_5$ and $R_6$ are methyl groups.

The amine-terminated, substantially linear siloxane compound can comprise other siloxane repeating units in addition to those conforming to the structures of Formula (I) and Formula (V). The siloxane repeating units of the amine-terminated, substantially linear siloxane compound can be arranged in either a block configuration (i.e., with siloxane repeating units of one formula arranged in blocks of multiple repeating units connected to each other) or a random configuration (i.e., with the siloxane repeating units of the different formula being randomly distributed within the compound). Preferably, the siloxane repeating units in the amine-terminated, substantially linear siloxane compound are arranged in a random configuration.

The amine-terminated, substantially linear siloxane compound further comprises terminal groups at the two ends of the siloxane backbone formed by the linked siloxane repeating units. These terminal groups preferably comprise at least one primary or secondary amine group, which provides a site for the compound to react with an epoxy resin. In a preferred embodiment, the amine-terminated, substantially linear siloxane compound comprises terminal groups conforming to the structure of Formula (X) and Formula (XI)

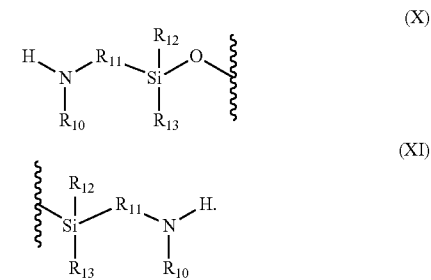

In the structures of Formula (X) and (XI), $R_{10}$ is selected from the group consisting of hydrogen, alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups. $R_{11}$ is selected from the group consisting of alkanediyl groups and substituted alkanediyl groups. $R_{12}$ and $R_{13}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups.

In a preferred embodiment, $R_{10}$ is selected from the group consisting of hydrogen, alkyl groups (e.g., $C_1$-$C_{30}$ alkyl groups), and aminoalkyl groups (e.g., $C_1$-$C_{30}$ aminoalkyl groups). More preferably, $R_{10}$ is selected from the group consisting of hydrogen, $C_1$-$C_8$ alkyl groups, and $C_1$-$C_8$ aminoalkyl groups. Examples of preferred aminoalkyl groups for such embodiments are aminomethyl, 2-aminoethyl, and 3-aminopropyl.

In a preferred embodiment, $R_{11}$ is selected from the group consisting of $C_1$-$C_{30}$ alkanediyl groups (e.g., $C_1$-$C_8$ alkanediyl groups) and $C_1$-$C_{30}$ substituted alkanediyl groups (e.g., $C_1$-$C_8$ substituted alkanediyl groups). More preferably, $R_{11}$ is selected from the group consisting of $C_1$-$C_8$ alkanediyl groups and $C_1$-$C_8$ substituted alkanediyl groups. Examples of preferred groups for such embodiments are ethane-1,2-diyl, propane-1,3-diyl, —CH$_2$CH(OH)CH$_2$OCH$_2$CH$_2$CH$_2$—, and —CH$_2$CH(CH$_2$OH)OCH$_2$CH$_2$CH$_2$—.

In a preferred embodiment, $R_{12}$ and $R_{13}$ are independently selected from the group consisting of alkyl groups, preferably $C_1$-$C_{30}$ alkyl groups, and more preferably $C_1$-$C_8$ alkyl groups. In a particularly preferred embodiment, $R_{12}$ and $R_{13}$ are methyl groups.

The amine-terminated, substantially linear siloxane compound can contain any suitable number of siloxane repeating units. Preferably, the total number of siloxane repeating units in the amine-terminated, substantially linear siloxane compound is about 500 or less, about 400 or less, about 300 or less, about 200 or less, about 100 or less, about 50 or less, about 40 or less, about 30 or less, about 25 or less, about 20 or less, about 15 or less, or about 10 or less. In another preferred embodiment, the total number of siloxane repeating units in the amine-terminated, substantially linear siloxane compound is about 3 or more, about 4 or more, or about 5 or more. Thus, in certain possibly preferred embodiments, the total number of siloxane repeating units in the amine-terminated, substantially linear siloxane compound is about 3 to about 500 (e.g., about 3 to about 400, about 3 to about 300, about 3 to about 200, about 3 to about 100, about 3 to about 50, about 3 to about 40 or less, about 3 to about 30 or less, about 3 to about 25 or less, about 3 to about 20 or less, about 3 to about 15 or less, or about 3 to about 10 or less), about 4 to about 500 (e.g., about 4 to about 400, about 4 to about 300, about 4 to about 200, about 4 to about 100, about 4 to about 50, about 4 to about 40 or less, about 4 to about 30 or less, about 4 to about 25 or less, about 4 to about 20 or less, about 4 to about 15 or less, or about 4 to about 10 or less), or about 5 to about 500 (e.g., about 5 to about 400, about 5 to about 300, about 5 to about 200, about 5 to about 100, about 5 to about 50, about 5 to about 40 or less, about 5 to about 30 or less, about 5 to about 25 or less, about 5 to about 20 or less, about 5 to about 15 or less, or about 5 to about 10 or less).

As noted above, the amine-terminated, substantially linear siloxane compound comprises terminal groups that preferably comprise at least one primary or secondary amine group. As demonstrated by the structures of Formulae (X) and (XI), these terminal groups can comprise more than one such amine group. Preferably, the number and type of amine groups present on the amine-terminated, substantially linear siloxane compound is sufficient to yield a compound exhibiting an amine hydrogen equivalent weight of about 8,000 g/eq. or less. More preferably, the amine-terminated, substantially linear siloxane compound exhibits an amine hydrogen equivalent weight of about 7,000 g/eq. or less, about 6,000 g/eq. or less, about 5,000 g/eq. or less, about 4,000 g/eq. or less, about 3,000 g/eq. or less, about 2,000 g/eq. or less, about 1,000 g/eq. or less, about 750 g/eq. or less, about 500 g/eq. or less, about 400 g/eq. or less, or about 300 g/eq. or less.

The amine-terminated, substantially linear siloxane compound can be produced by any suitable process. However, in another embodiment, the invention provides a process for producing the amine-terminated, substantially linear siloxane compound described above. This process begins with a hydrosiloxane-containing compound. This hydrosiloxane-containing compound can either be substantially linear or cyclic in structure. At least a portion of the siloxane repeating units in the hydrosiloxane-containing compound are hydrosiloxane groups conforming to the structure of Formula (XX)

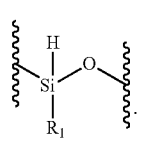

(XX)

In the structure of Formula (XX), $R_1$ is selected from the groups described above in connection with the amine-terminated, substantially linear siloxane compound of the invention. The hydrosiloxane-containing compound can comprise other siloxane repeating units in addition to those conforming to the structure of Formula (XX). For example, the hydrosiloxane-containing compound can comprise siloxane repeating units conforming to the structure of Formula (V) as described above. If the compound is linear, the hydrosiloxane-containing compound can comprise terminal groups. The terminal groups can have any suitable structure, but preferably the terminal groups do not contain a hydrosiloxane group. In a preferred embodiment, the hydrosiloxane-containing compound is a substantially linear hydrosiloxane-containing compound comprising terminal groups conforming to the structure of Formula (XXV) and (XXVI)

(XXV)

(XXVI)

In the structures of Formula (XXV) and (XXVI), $R_{25}$, $R_{26}$, and $R_{27}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups. In a preferred embodiment, $R_{25}$, $R_{26}$, and $R_{27}$ are independently selected from the group consisting of alkyl groups, preferably $C_1$-$C_{30}$ alkyl groups, and more preferably $C_1$-$C_8$ alkyl groups. In a particularly preferred embodiment, $R_{25}$, $R_{26}$, and $R_{27}$ are methyl groups.

In the first step of the process, the hydrosiloxane-containing compound described above is reacted with an aromatic-substituted alkene or alkyne having the formula $R_{30}$—$R_3$. $R_3$ is selected from the groups described above, and $R_{30}$ is selected from the group consisting of unbranched and branched alkenyl groups and unbranched and branched alkynyl groups. $R_{30}$ preferably is selected form the group consisting of $C_1$-$C_8$ alkenyl groups and $C_1$-$C_8$ alkynyl groups, more preferably $C_1$-$C_4$ alkenyl groups and $C_1$-$C_8$ alkynyl groups. Specific examples of suitable aromatic-substituted alkenes or alkynes include, but are not limited to, styrene (i.e., phenylethylene) and α-methylstyrene (i.e., 2-phenylpropene).

The hydrosiloxane-containing compound and the aromatic-substituted alkene/alkyne are reacted in a hydrosilylation reaction in the presence of a suitable catalyst, such as a platinum catalyst. A wide variety of hydrosilylation catalysts have been described in the literature. U.S. Pat. No. 6,030,919 (Lewis) generally describes platinum catalysts suitable for use in hydrosilylation reactions. Suitable industrial catalysts include, but are not limited to, Speier's catalyst (chloroplatinic acid in 2-propanol), Ashby's catalyst (a platinum (0)-cyclovinylmethylsilxoane complex), and Karstedt's catalyst (a platinum (0) divinyltetramethyldisiloxane complex). The literature also cites platinum oxide (Nicolas Sabourault at al., Organic Letters, 4, 13, p. 2117-2119, (2002)) as well as platinum carbene complexes as effective hydrosilylation catalysts (István E. Markó et al., Science 298, p. 204, (2002)). A variety of other metal catalysts such as those containing palladium, rhodium, ruthenium, or iridium are also known to be active for hydrosilylation (M. A. Brook, Silicon in Organic, Organometallic, and Polymer Chemistry, pp. 401, John Wiley & Sons, 2000). Recent work has also demonstrated that hydrosilylation can be effectively catalyzed by metal complexes of non-noble metals as well.

In the hydrosilylation reaction, the unsaturated bond in the alkene or alkyne reacts with the hydrosiloxane group in the compound to form a bond between the silicon atom and the alkene or alkyne. The result is a siloxane unit conforming to the structure of Formula (I) as described above, where $R_2$ represents an alkanediyl or alkenediyl group derived from $R_{30}$ of the alkene or alkyne. This siloxane unit can be present in a substantially linear siloxane intermediate (when a substantially linear hydrosiloxane-containing compound is used) or a cyclic siloxane intermediate (when a cyclic hydrosiloxane-containing compound is used). After the hydrosilylation reaction is complete, the resulting siloxane intermediate can be reacted with an additional alkene or alkyne, preferably a linear alkene or alkyne such as octene, and more preferably a linear alkene or alkyne with the point of unsaturation at the 1 position such as oct-1-ene, in order to fully react any residual hydrosiloxane groups in the siloxane intermediate.

In the last step of the process, the siloxane intermediate is reacted with an amine-terminated siloxane compound in a base catalyzed equilibration reaction. In this sense, the term "amine-terminated siloxane compound" is used to refer to a siloxane compound in which the terminal siloxy groups are substituted to a high degree with an amine-containing functional group, such as the group represented by the moiety —$NHR_{10}$ in the structures of Formula (X) and (XI) above. In this equilibration reaction, the siloxane linkages in the siloxane intermediate and the amine-terminated siloxane compound are broken apart and then recombine to form the amine-terminated, substantially linear siloxane compound described above.

Further, if a substantially linear siloxane intermediate is used, it is necessary to remove the non-amine containing terminal siloxy groups of the intermediate (i.e., the siloxy groups conforming to the structure of Formula (XXV) or (XXVI)) to ensure that the resulting siloxane compound contains a relatively large percentage of amine-terminated siloxy groups, such as the terminal groups conforming to the structure of Formula (X) and (XI)). This is accomplished by forming a disiloxane compound composed of siloxy groups conforming to the structures of Formula (XXV) and (XXVI), and then removing the resulting disiloxane compound from the base-catalyzed reaction medium. Thus, if the substantially linear siloxane intermediate contained trimethylsiloxy terminal groups, then hexamethyldisiloxane preferably is removed from the base-catalyzed reaction medium in order to yield the desired amine-terminated, substantially linear siloxane compound. This disiloxane compound can be removed from the reaction medium by distillation processes based on the modest boiling point of the hexamethyldisiloxane.

The base catalyzed equilibration reaction can be performed under any suitable conditions that cause the equilibration described above. Suitable conditions and reactants are described in, for example, Chapter 1 of the book *Silicon-Containing Polymers: The Science and Technology of Their Synthesis and Applications* (James et al., Dordrecht: Kluwer Academic Publishers, 2000). In one particular example, the base catalyzed equilibration reaction can be performed using a tetraalkylammonium hydroxide (e.g., tetraethylammonium hydroxide) as the base. The reaction mixture preferably is heated, such as to a temperature of about 80° C., in order to accelerate the reaction and permit distillation of the disiloxane compound.

As noted above, the amine-terminated, substantially linear siloxane compound is believed to be well-suited for use in epoxy products. In particular, it is believed that the amine groups of the amine-terminated, substantially linear siloxane compound will react with the epoxide groups of an epoxy resin to incorporate the amine-terminated, substantially linear siloxane compound into the epoxy product and impart desirable physical properties to the product. For example, it is believed that the amine-terminated, substantially linear siloxane compound can improve surface properties of the epoxy, such as gloss and shine, and also impart a degree of hydrophobicity to the epoxy. Also, the amine-terminated, substantially linear siloxane compound is believed to improve the flexibility (i.e., reduce brittleness) of epoxy products into which it is incorporated.

Thus, in a second embodiment, the invention provides an epoxy product obtained by reacting an epoxy resin and an amine-terminated, substantially linear siloxane compound as described above. The amine-terminated, substantially linear siloxane compound can be any embodiment of the amine-terminated, substantially linear siloxane compound described above. In forming this product, the amine-terminated, substantially linear siloxane compound can be used as the sole hardener (or curing agent) for the epoxy resin, or the amine-terminated, substantially linear siloxane compound can be used in combination with other hardeners suitable for curing the epoxy resin.

Any suitable epoxy resin can be used to produce the product. Suitable epoxy resins are described in "Handbook of Epoxy Resins" by Henry Lee and Kris Neville (McGraw Hill Book Company, 1982 reissue), "Protective Coatings Fundamental of Chemistry and Composition" by C. H. Hare (SSPC 1994), and other references. Suitable epoxy resins include, but are not limited to, bisphenol epoxy resins, novolac epoxy resins, glycidyl epoxy resins (e.g., aliphatic glycidyl ethers and ester and cycloaliphatic glycidyl ethers), cycloaliphatic epoxides, glycidylamine epoxy resins, and mixtures thereof.

Bisphenol epoxy resins suitable for use include, but are not limited to, those conforming to the structure of Formula (XC)

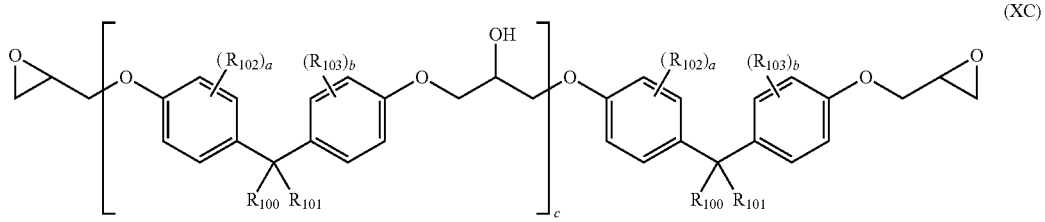

In the structure of Formula (XC), $R_{100}$ and $R_{101}$ are independently selected from the group consisting of hydrogen, alkyl groups, haloalkyl groups, and aryl groups. $R_{102}$ and $R_{103}$ are independently selected from the group consisting of halogen, alkyl groups, and aryl groups. The variables a and b are independently selected from the group consisting of 0, 1, and 2; and the variable c is selected from the group consisting of 0 and integers from 1 to 50, more preferably 0 and integers from 1 to 25. Suitable commercial examples of these epoxy resins are available from Momentive (formely Hexion) under the tradename "Epon", The Dow Chemical Company (tradename "D.E.R."), and Huntsman Corporation's Advanced Materials business unit (tradename "Araldite").

Novolac epoxy resins suitable for use include, but are not limited to, those conforming to the structure of Formula (XCI)

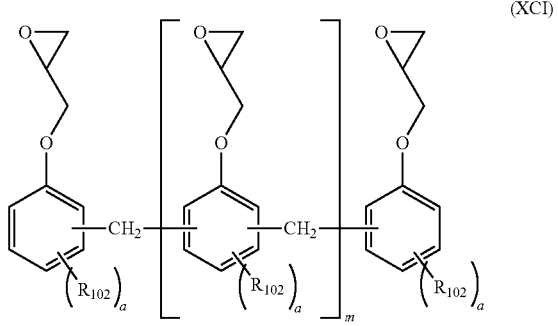

In the structure of Formula (XCI), $R_{102}$ is selected from the group consisting of halogen, alkyl groups, haloalkyl groups, and aryl groups. The variable a is selected from the group consisting of 0, 1, and 2; and the variable m is selected from the group consisting of 0 and integers from 1 to 50, more preferably 0 and integers from 1 to 25. Suitable commercial examples of these resins are available from The Dow Chemical Company (tradename "D.E.N.™"), and Huntsman Corporation's Advanced Materials business unit (tradename "Araldite").

Cycloaliphatic glycidyl ether epoxy resins suitable for use include, but are not limited to, those conforming to the structure of Formula (XCII)

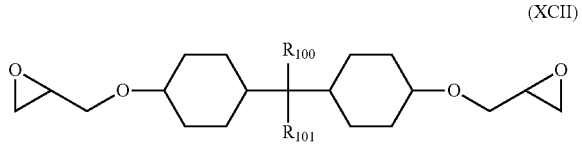

In the structure of Formula (XCII), $R_{100}$ and $R_{101}$ are independently selected from the group consisting of hydrogen, alkyl groups, haloalkyl groups, and aryl groups. Suitable commercial examples of these materials are believed to be available from Momentive (formely Hexion) under the tradename "Epon" or from CVC Thermoset Specialties under the tradename "Epalloy™."

In forming the product, the epoxy resin and the amine-terminated, substantially linear siloxane compound can be reacted in any suitable amounts. As will be understood by those familiar with the art, the suitable amounts for each of these components will depend upon the desired properties for the product. For example, when one desires to produce a cured epoxy product, the epoxy resin and the amine-terminated, substantially linear siloxane compound are reacted in a ratio of amine-terminated, substantially linear siloxane compound to epoxy resin of greater than 0.6:1 to less than 1.4:1, more preferably about 0.8:1 to about 1.2:1, based on the amine equivalents of the amine-terminated, substantially linear siloxane compound and the epoxy equivalents of the epoxy resin. Alternatively, when one desires to produce an epoxy-rich adduct that can later be reacted with additional hardener to produce a cured epoxy product, the epoxy resin and the amine-terminated, substantially linear siloxane compound can be reacted in a ratio of amine-terminated, substantially linear siloxane compound to epoxy resin of about 0.5:1 or less, more preferably about 0.4:1 or less, about 0.3:1 or less, about 0.2:1 or less, or about 0.1:1 or less, based on the amine equivalents of the amine-terminated, substantially linear siloxane compound and the epoxy equivalents of the epoxy resin. Such an epoxy-rich adduct preferably is liquid at room temperature and preferably exhibits a viscosity of about 10,000 cP or less. When one desires to produce an amine-rich adduct that can later be reacted with additional epoxy resin to produce a cured epoxy product, the epoxy resin and the amine-terminated, substantially linear siloxane compound can be reacted in a ratio of amine-terminated, substantially linear siloxane compound to epoxy resin of about 2:1 or more, more preferably about 2.5:1 or more, about 3:1 or more, about 5:1 or more, or about 10:1 or more, based on the amine equivalents of the amine-terminated, substantially linear siloxane compound and the epoxy equivalents of the epoxy resin. Such an amine-rich adduct preferably is liquid at room temperature and preferably exhibits a viscosity of about 10,000 cP or less. Those skilled in the art will recognize that stoichiometric ratios closer to 1:1 between amine hydrogen equivalents and epoxy equivalents will tend to be higher in viscosity, with a tendency to form gels or solids as the ratio approaches 1:1. It is also evident that the component that is the lower stoichiometric content should be added to the component in excess, and that mixing and cooling may be required to obtain uniform reaction and limited rate of reaction while addition is taking place and that adequate control over the reaction is needed to obtain a consistent useable product. U.S. Pat. No. 8,263,687 (Gianini et al.) describes the formation of amine-epoxy adducts and provides examples of reaction conditions.

As noted above, an amine group of the amine-terminated, substantially linear siloxane compound will react with an epoxide group on the epoxy resin. This reaction proceeds in the typical manner of a reaction between an amine-based hardener and an epoxy resin. The result of such a reaction is a product in which the amine-terminated, substantially linear siloxane compound and the epoxy resin have been linked in a moiety conforming to the structure of Formula (L)

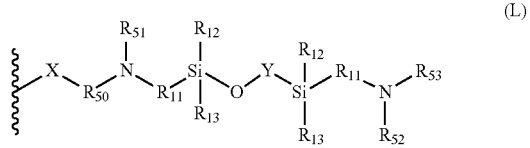

In the structure of Formula (L), X is a moiety derived from a group linking epoxide groups in an epoxy resin. $R_{11}$, $R_{12}$ and $R_{13}$ are selected from the groups described above in connection with the amine-terminated, substantially linear siloxane compound. $R_{50}$ is a divalent linking group produced by ring opening of an epoxide group resulting from the reaction between the nucleophilic nitrogen and one of the electrophilic carbons of the epoxide. Thus, $R_{50}$ preferably is a divalent group selected from the group consisting of —$CH_2CH(OH)CH_2$— and —$CH_2CH(CH_2OH)$—.

In the structure of Formula (L), $R_{51}$, $R_{52}$, and $R_{53}$ are derived from the pendant groups for the amine nitrogen atoms that were present in the terminating groups of the amine-terminated, substantially linear siloxane compound. Accordingly, $R_{51}$, $R_{52}$, and $R_{53}$ can be selected from the groups described above for $R_{10}$ in connection with the amine-terminated, substantially linear siloxane compound. Further, if $R_{10}$ of the amine-terminated, substantially linear siloxane compound was hydrogen, it is possible for the amine nitrogen to react with an additional epoxy group as described above. The result would be another group having the structure —X—$R_{50}$— attached to the amine nitrogen. This reaction may or may not occur depending upon several factors, such as the relative amounts of the amine-terminated, substantially linear siloxane compound and the epoxy resin present in the reaction mixture used to make the epoxy product. For example, if an amine-rich adduct is being produced, only one of the amine groups may react with the epoxy resin due to the limited amount of epoxy resin present in the reaction mixture. Thus, $R_{51}$, $R_{52}$, and $R_{53}$ are independently selected from the group consisting of hydrogen, alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and —X—$R_{50}$—.

In the structure of Formula (L), Y is a substantially linear siloxane moiety comprising a plurality of siloxane repeating units. The moiety is derived from the amine-terminated, substantially linear siloxane compound described above. Thus, the moiety Y comprises a plurality of siloxane repeating units, a portion of which conform to the structure of Formula (I) and a portion of which conform to the structure of Formula (V) as described above. The particular substituents for the siloxane repeating units and the relative amounts of each siloxane repeating unit can be any of those described above in connection with the amine-terminated, substantially linear siloxane compound of the invention.

As noted above, the amine-terminated, substantially linear siloxane compound of the invention can be reacted with any suitable epoxy resin. Thus, the moiety X can be derived from any suitable epoxy resin. For example, when the epoxy resin is a bisphenol epoxy resin, the moiety X is a moiety conforming to the structure of Formula (C)

alkyl groups, and aryl groups. The variables a and b are independently selected from the group consisting of 0, 1, and 2; and the variable c is selected from the group consisting of 0 and integers from 1 to 50, more preferably 0 and integers from 1 to 25.

The epoxy products described above are suited to many different applications. For example, it is believed that such epoxy products are well-suited for use in producing epoxy coatings on substrates. Thus, in one embodiment, the invention provides a coated substrate comprising a substrate having a surface and a solid coating applied to at least a portion of the surface. The solid coating comprises an epoxy product as described above. The substrate can be any suitable substrate, such as a metal (e.g., steel) substrate.

The following examples further illustrate the subject matter described above but, of course, should not be construed as in any way limiting the scope thereof.

EXAMPLE 1

This example demonstrates the hydrosilylation of tetramethylcyclotetrasiloxane with α-methylstyrene (2-phenylpropene). The resulting compound can be used in producing the amine-terminated, substantially linear siloxane compound of the invention.

A 250 mL round bottom 3 necked reaction vessel was fitted with a mechanical stirrer, a condenser topped with a nitrogen flow adapter, and a Claisen adapter fitted with a temperature probe/temperature controller/heating mantle and an addition funnel. 178.65 g of tetramethylcyclotetrasiloxane (SIT7530.0 from Gelest, 0.0166 equivalents SiH) was added to the reaction vessel, degassed with nitrogen flow, and temperature was raised to 75° C. 600 uL of a 1 wt. % H2PtCl6 H2O in IPA (Speier's Catalyst) was added. 421.35 g (0.020 equivalents) of 2-methyl styrene was put into the addition funnel and part was added drop wise to the reaction mixture. An exotherm was observed after about ¼ of the total 2-methyl styrene was added. After addition was completed the temperature of the reaction mixture was raised 100 to 105° C. for one hour. Residual SiH content was tested using calibrated FTIR. The reaction mixture was vacuum stripped at 165° C. to remove volatiles. Analysis by $^1$H and $^{29}$Si NMR confirms complete reaction to form 1,3,5,7-tetra-2-methylethylbenezene-1,3,5,7-tetramethylcyclotetrasiloxane.

EXAMPLE 2

This example demonstrates the production of an amine-terminated, substantially linear siloxane compound according to the invention comprising amine-containing terminal groups.

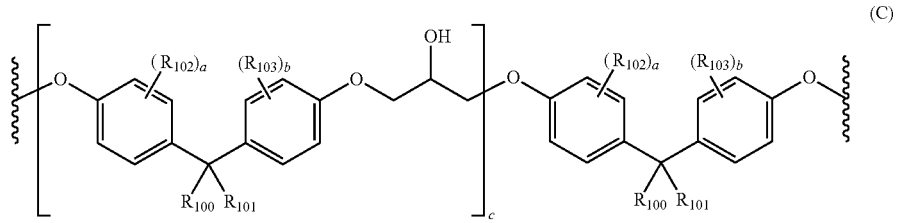

(C)

In the structure of Formula (C), $R_{100}$ and $R_{101}$ are independently selected from the group consisting of hydrogen, alkyl groups, haloalkyl groups, and aryl groups. $R_{102}$ and $R_{103}$ are independently selected from the group consisting of halogen, A 250 mL round bottom 3 necked reaction vessel was fitted with a mechanical stirrer, a condenser topped with a nitrogen flow adapter, and a temperature probe/temperature controller/heating mantle and an addition funnel. 38.41 g (1.6 mmol), of bis-3-aminopropyl tetramethyldisiloxane (SiVance) 10.60 g (0.539 moles) of octamethylcyclotetrasiloxane (Gelest), and 50.99 g (0.0179 moles) of the 1,3,5,7-tetra-2-phenyl propyl-1,3,5,7-tetramethylcyclotetrasiloxane prepared according to Example 1 were added to the round bottom reaction vessel, mixing initiated and then 0.75 g of a tetramethylamonnium hydroxide 25% aqueous solution was added. The temperature was then raised to 100° C. and held for 24 hours. When equilibrium was reached the free bis-3-aminopropyl tetramethyldisiloxane in the reaction mixture was below about 10% of the original content as measured by calibrated gas chromatography. The tetramethylammonium hydroxide was neutralized with 10% acetic acid/toluene. And the reaction mixture was vacuum stripped at 150° C. to remove unreacted bis-3-aminopropyl tetramethyldisiloxane and other volatiles.

EXAMPLE 3

This example demonstrates the production of a dimethyl methylhydrogen polysiloxane compound, which is suitable for use in making the amine-terminated, substantially linear hydrosiloxane-containing compound of the invention.

A 3 necked 20 L flask fitted with mechanical stirrer, condenser topped with a nitrogen inlet tube, temperature probe, temperature controller/heating mantle was assembled. To the round bottom reaction vessel was added 204.9 g (1.26 moles) hexamethyldisiloxane, 6312.9 g (21.28 moles) octamethylcyclotetrasiloxane, and 5464.3 g (2.13 moles) linear polymethylhydrogen siloxane fluid (30 cSt). The system was flushed with nitrogen, and 17.9 g triflic acid was added. The reaction mixture was stirred and heated at 65-70° C. for 5 hours. Volatility testing and gas chromatography (GC) was used to indicate when volatility was less than about 10 wt. %. The reaction was cooled to 35 to 40° C. and 150 g MgO powder was added and stirred for 1 hour. The mixture was tested for neutrality and filtered. It was then vacuum stripped. The reaction product was characterized by $^1$H and $^{29}$Si NMR and quantified for SiH content using calibrated FTIR. The final product contained 6.69 mmol SiH/g.

EXAMPLE 4

This example describes the production of a platinum catalyst masterbatch suitable for use in the hydrosilylation reaction described herein.

A masterbatch was prepared by mixing 6.67 g of Karstedt's catalyst (Gelest SIP6830.3, containing 3.0 wt. % Pt) with 93.33 g of toluene. The final platinum concentration was 0.200 wt. %.

EXAMPLE 5

This example describes the production of a platinum catalyst masterbatch suitable for use in the hydrosilylation reaction described herein.

295.6 g of α-methylstyrene (2-phenylpropene) was blended with 4.40 g of Platinum Catalyst Masterbatch with mixing.

EXAMPLE 6

This example demonstrates the hydrosilylation of the dimethyl methylhydrogen polysiloxane compound produced in Example 3.

A 3 necked 250 mL flask was fitted with mechanical stirrer, condenser topped with a nitrogen air inlet tube, and a Claisen adapter with a dropping funnel and temperature probe, heating mantle and temperature controller. 40.57 g (0.28 equivalents SiH) of the Dimethyl methylhydrogen polysiloxane compound (Example 3) was put into the reaction flask and stirring commenced. The system was purged with nitrogen. 34.89 g of 2-methylstyrene Platinum Masterbatch, contributing 0.29 moles of 2-methylstyrene and 0.48 mg Pt, was put into the addition funnel. The temperature was raised to 35° C. After attainment of temperature, 0.238 g of the Platinum Catalyst Masterbatch was added to the reaction vessel. After 1 minute of mixing, slow addition of the 2-methylstyrene Platinum Masterbatch was initiated. The rate of addition was controlled and the heating mantle was removed to keep the reaction mixture temperature between 35 and 55° C. After completion of addition, the combined platinum dosage was 20 ppm Pt relative to the total reactive components. The reaction mixture was held at 35° C. and stirred for 3 hours. A sample was removed and tested for silicon hydride content using $^1$H NMR. The integrated area of the peak at about 4.7 ppm for the reaction mixture was compared against a non-catalyzed reaction mixture of the same composition. After 3 hours of reaction, only about 10% of the original reactive silicone hydride remained.

EXAMPLE 7

This example demonstrates the hydrosilylation of the dimethyl methylhydrogen polysiloxane compound produced in Example 3.

A 3 necked 250 mL flask was fitted with mechanical stirrer, condenser topped with a nitrogen air inlet tube, and a Claisen adapter with a dropping funnel and temperature probe, heating mantle and temperature controller. 40.57 g (0.28 equivalents SiH) of the dimethyl methylhydrogen polysiloxane compound (Example 1) was put into the reaction flask and stirring commenced. The system was purged with nitrogen. 34.89 g of 2-Methylstyrene Platinum Masterbatch, contributing 0.29 moles of 2-methylstyrene and 0.48 mg Pt, was put into the addition funnel. The temperature was raised to 85° C. After attainment of temperature, 0.238 g of the Platinum Catalyst Masterbatch was added to the reaction vessel. After 1 minute of mixing, slow addition of the 2-methylstyrene Platinum Masterbatch was initiated. The rate of addition was controlled and the heating mantle was removed to keep the reaction mixture temperature between 85 and 105° C. After completing the addition the combined platinum dosage was 20 ppm Pt relative to the total reactive components. The reaction mixture was held at 85° C. and stirred for 3 hours. A sample was removed and tested for silicon hydride content using $^1$H NMR. The integrated area of the peak at about 4.7 ppm for the reaction mixture was compared against a non-catalyzed reaction mixture of the same composition. After 3 hours of reaction, about 33% of the original reactive silicone hydride remained.

EXAMPLE 8

This example demonstrates the hydrosilylation of the dimethyl methylhydrogen polysiloxane compound produced in Example 1 to yield a dimethyl methyloctyl methyl 2-methylethylbenzene polysiloxane compound.

A 22 L round bottom flask was fitted with a mechanical stirrer, addition funnel, temperature probe, a reflux condenser topped with an nitrogen gas flow adapter, and fitted with a warm water bath. 8398.4 g of Dimethyl methylhydrogen polysiloxane Intermediate (56.2 equivalents of SiH) was put into the round bottom reaction vessel. 6896.6 g 2-Methylstyrene Platinum Masterbatch (57.3 moles of 2-methylstyrene) was put into the addition funnel. Nitrogen gas was used to flush the system. The temperature in the reaction vessel was stabilized at 35° C. 35.6 g of Platinum Catalyst Masterbatch solution was added to the reaction vessel and mixed 1 minute. Slow addition of 2-Methylstyrene Platinum Masterbatch was commenced. Temperature of the reaction mixture was held to between 35 and 50° C. by adding ice to the water bath. The reaction mixture was held to 35 to 55° C. for 3 hours following completion of addition of the 2-Methylstyrene Platinum Masterbatch. SiH content was measured using calibrated FTIR.

A heating mantle and temperature controller was installed to replace the water bath. 669.4 g of oct-1-ene was put into addition the addition funnel. The reaction mixture was heated to 50° C. Upon addition of oct-1-ene a modest exotherm was observed. Temperature was raised to 85° C. and held for 16 hours. SiH was consumed to less than 0.02 mmol/g. The reaction mixture was subjected to vacuum and heat in steps to 165° C. to remove volatiles.

EXAMPLE 9

This example demonstrates the production of an amine-terminated, substantially linear siloxane compound according to the invention.

Assemble a 12 L round bottom 4 necked flask, fitted with a mechanical mixer, a Barrett trap fitted with a condenser topped with a gas flow adapter and a bubbler, an nitrogen flow adapter, and a thermocouple attached to a temperature controller and a heating mantle. Put into the round bottom reaction vessel 1361.67 g of a bis-aminopropyl dimethyl siloxy polydimethyl siloxane of molecular weight 375 g/mole (1.70 dimethyl groups/molecule), 2438.3 g Dimethyl methyloctyl methyl 2-methylethylbenzene polysiloxane Intermediate, and 28.50 g of tetramethylammonium hydroside, 25% aqueous solution. Initiate mixing, flush with nitrogen, and pull a sample for GC comparison as the initial sample. Raise the temperature to 110° C. Initiate modest nitrogen flow and capture HMDSO (about 80 g) in the Barrett trap chilled in a dry ice bath. Perform GC analysis after 2, 4, and 24 hours reaction time, and monitor utilization of bis-aminopropyl tetramethyl disiloxane. Let react about 23 hours reaction time to achieve equilibrium and bis-aminopropyl tetramethyl disiloxane content about 6 to 12% of originally present. When equilibrium is reached add 28.50 g of 10% acetic acid in toluene. Let stir for one hour. Confirm neutralization of the tetramethyl ammonium hydroxide on a 1 gram sample. Add 2 drops of a saturated indigo carmine indicator (IPA/water 50 wt. %) solution per gram of reaction mixture. A blue color that is retained after 10 minutes indicates neutralization. Vacuum strip up to 165° C. to remove volatiles. The resulting polymeric product was analyzed using $^{29}Si$ and $^{1}H$ NMR. Spectra were consistent with formation of an α,ω-3-aminopropyl dimethyl endcapped siloxane terpolymer containing an average of 4.4 dimethyl siloxy groups, 2.9 methyl 2-methylethylbenzene siloxy groups and 0.4 methyloctyl siloxy groups.

EXAMPLE 10

This example demonstrates the production of an epoxy product using the amine-terminated, substantially linear siloxane compound of Example 9.

A reactive mixture was prepared by combining a cycloaliphatic epoxy resin, HBE-100 from New Japan Ltd., with the amine-terminated, substantially linear siloxane compound of Example 9. The epoxy and the siloxane were combined at a 1:1 epoxy to amine hydrogen equivalent ratio in a 20 mL FlackTek screw cap plastic container as shown in Table 1. Samples were mixed for 1 min at 2300 RPM in a FlackTek mixer (FlackTek Inc., model DAC400.1 FVZ). The container and mixed contents were cured at 70° C. for 4 hours. The cured epoxy object in the form of a disk was removed from the container and measured for Shore A hardness.

TABLE 1

| Amino Curing Agent | AHEW | Grams Epoxy | EEW | Grams Epoxy | Hardness, Shore A |
|---|---|---|---|---|---|
| Example 14 | 276 | 5.62 | HBE-100 | 215 | 4.38 | 59 |

EXAMPLE 11

This example demonstrates the production of an epoxy product using the amine-terminated, substantially linear siloxane compound of Example 9.

A reactive mixture was prepared by combining 25.0 g of Adeka EP-4080E cycloaliphatic epoxy resin (EEW 235 g/eq) with 31.4 g of the amine-terminated, substantially linear siloxane compound of Example 9 (ANEW 299 g/eq) in a 20 mL FlackTek screw cap plastic container. Samples were mixed for 1 min at 2300 RPM in a FlackTek mixer (FlackTek Inc., model DAC400.1 FVZ). The reactive mixture was essentially bubble free and poured into a polished stainless steel mold designed to form a cast slab of uniform thickness in accordance with ASTM D 412 with a release agent (Henkel 1711). The filled mold was placed into an oven at 70° C. for 4 hours.

After curing, the cast slab was removed from the mold and test pieces were punched out following ASTM D412 methods. Pieces were subjected to mechanical testing using an MTSQ-Test/5 mechanical tester fitted with a DX 2000 High Strain Extensiometer utilizing a 500 N load cell. Results are set forth in Table 2 below.

TABLE 2

Summary of Mechanical Testing

| Property | ASTM method | Measured Value | Units |
|---|---|---|---|
| Elongation at break | D412 | 51 | % |
| Stress at break | D412 | 0.5 | MPa |
| Modulus | D412 | 1.57 | MPa |
| Tear | D624 | 1.97 | N/mm |

EXAMPLE 12

Model coating formulations were prepared using various amine curing agents at a 1:1 epoxy to amine hydrogen equivalent ratio to cure a cycloaliphatic diepoxy resin, Adeka EP-4080E, as shown in Table 3. The epoxy resin and amine curative were combined by weight in a 20 mL FlackTek screw cap plastic container by weight as shown in Table 3. The contents were mixed for 40 seconds at 2300 RPM in a FlackTek mixer (FlackTek Inc., model DAC400.1 FVZ).

Six inch steel Q panels were wiped with solvent. Approximately 1 gram of the freshly mixed model coating formula was applied to the top of the panel and drawn down using a U-shaped draw down bar to form a 4 mil thick coating. The coated panels were cured at 70° C. for 4 hours.

Water equilibrium contact angles were measured using a Krüss model DSA 10 sessile drop contact angle system to assess hydrophobicity of the coating. Acquired solvent drop images were evaluated using Drop Shape Analysis software to derive the equilibrium contact angle. An average of 5 drops is given in Table 3.

TABLE 3

Formulation of Epoxy Coating and Properties

| Amino Curing Agent | AHEW | Grams | Grams Adeka EP-4080E Epoxy | Appearance | Water Contact Angle, Degrees |
|---|---|---|---|---|---|
| isophorone diamine cycloaliphatic diamine | 43 | 0.91 | 5.00 | mottled film with many areas of dewetting | 62.0 ± 1.5 |
| bis-3-aminopropyl dimethyl siloxane | 110 | 2.34 | 5.00 | irregular film with areas of dewetting | 81.9 ± 1.8 |
| Amine-terminated siloxane compound of Example 9 | 299 | 6.37 | 5.00 | smooth, high gloss film with no defects | 102.6 ± 1.6 |

EXAMPLE 13

This example demonstrates the production of an adduct of an epoxy resin and the amine-terminated, substantially linear siloxane compound of Example 9.

44.451 g (0.15 amine hydrogen equivalents) of the amine-terminated, substantially linear siloxane compound of Example 9 was combined with 5.549 g of EPON 828 (Polysciences Inc., Cat#02334, Lot:632980) (0.02 epoxy equivalents) at room temperature in a 60 mL FlackTek cup. This combination was mixed at room temperature using a Flack-Tek mixer at 2000 RPM for 45 seconds to produce a milky white emulsion. A magnetic stirring bar was then added and the mixture was slowly stirred on a magnetic stirrer at room temperature. With mixing overnight, the reactive mixture became transparent.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. An amine-terminated, substantially linear siloxane compound comprising a plurality of siloxane repeating units, wherein:
   (a) a portion of the siloxane repeating units are independently selected from the group consisting of siloxane repeating units conforming to the structure of Formula (I)

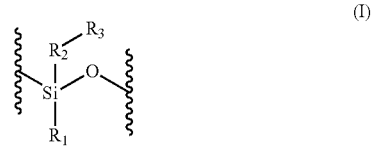

wherein $R_1$ is selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_2$ is selected from the group consisting of alkanediyl groups and alkenediyl groups; and $R_3$ is selected from the group consisting of aryl groups, substituted aryl groups, heteroaryl groups, and substituted heteroaryl groups;

(b) a portion of the siloxane repeating units are independently selected from the group consisting of siloxane repeating units conforming to the structure of Formula (V)

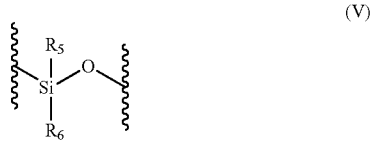

wherein $R_5$ and $R_6$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; and (c) the amine-terminated, substantially linear siloxane compound comprises terminal groups conforming to the structure of Formula (X) and Formula (XI)

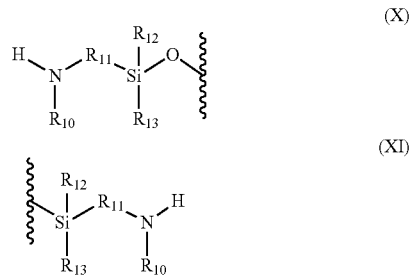

wherein $R_{10}$ is selected from the group consisting of hydrogen, alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_{11}$ is selected from the group consisting of alkanediyl groups and substituted alkanediyl groups; $R_{12}$ and $R_{13}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups.

2. The amine-terminated, substantially linear siloxane compound of claim 1, wherein the siloxane repeating units conforming to the structure of Formula (I) comprise about 1% or more of the siloxane repeating units in the amine-terminated, substantially linear siloxane compound.

3. The amine-terminated, substantially linear siloxane compound of claim 1, wherein the amine-terminated, substantially linear siloxane compound has a molecular weight, and the siloxane repeating units conforming to the structure of Formula (I) in the amine-terminated, substantially linear siloxane compound comprise about 15% to about 50% of the molecular weight of the amine-terminated, substantially linear siloxane compound.

4. The amine-terminated, substantially linear siloxane compound of claim 1, wherein the total number of siloxane repeating units in the compound is about 100 or less.

5. The amine-terminated, substantially linear siloxane compound of claim 4, wherein the total number of siloxane repeating units in the compound is about 50 or less.

6. The amine-terminated, substantially linear siloxane compound of claim 1, wherein the siloxane compound exhibits an amine hydrogen equivalent weight of about 8,000 g/eq. or less.

7. The amine-terminated, substantially linear siloxane compound of claim 1, wherein $R_1$, $R_5$, $R_6$, $R_{12}$, and $R_{13}$ are selected from the group consisting of alkyl groups.

8. The amine-terminated, substantially linear siloxane compound of claim 7, wherein $R_1$, $R_5$, $R_6$, $R_{12}$, and $R_{13}$ are methyl groups.

9. The amine-terminated, substantially linear siloxane compound of claim 1, wherein $R_3$ is selected from the group consisting of aryl groups.

10. The amine-terminated, substantially linear siloxane compound of claim 1, wherein $R_2$ is 2-methylethane-1,2-diyl, and $R_3$ is phenyl.

11. The amine-terminated, substantially linear siloxane compound of claim 1, wherein $R_{10}$ is selected from the group consisting of hydrogen and aminoalkyl groups.

12. A product obtained by reacting an epoxy resin and an amine-terminated, substantially linear siloxane compound, the amine-terminated, substantially linear siloxane compound comprising a plurality of siloxane repeating units, wherein:

(a) a portion of the siloxane repeating units are independently selected from the group consisting of siloxane repeating units conforming to the structure of Formula (I)

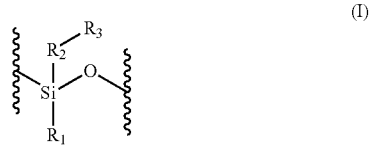

wherein $R_1$ is selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_2$ is selected from the group consisting of alkanediyl groups and alkenediyl groups; and $R_3$ is selected from the group consisting of aryl groups, substituted aryl groups, heteroaryl groups, and substituted heteroaryl groups;

(b) a portion of the siloxane repeating units are independently selected from the group consisting of siloxane repeating units conforming to the structure of Formula (V)

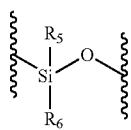

(V)

wherein $R_5$ and $R_6$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; and (c) the compound comprises terminal groups conforming to the structure of Formula (X) and Formula (XI)

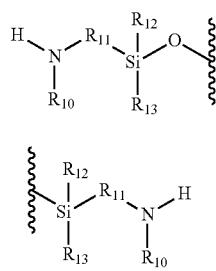

(X)

(XI)

wherein $R_{10}$ is selected from the group consisting of hydrogen, alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_{11}$ is selected from the group consisting of alkanediyl groups and substituted alkanediyl groups; $R_{12}$ and $R_{13}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups.

13. The product of claim 12, wherein the epoxy resin is selected from the group consisting of bisphenol epoxy resins, novolac epoxy resins, glycidyl epoxy resins, cycloaliphatic epoxides, glycidylamine epoxy resins, and mixtures thereof.

14. The product of claim 12, wherein the siloxane repeating units conforming to the structure of Formula (I) comprise about 1% or more of the siloxane repeating units in the amine-terminated, substantially linear siloxane compound.

15. The product of claim 12, wherein the amine-terminated, substantially linear siloxane compound has a molecular weight, and the siloxane repeating units conforming to the structure of Formula (I) in the amine-terminated, substantially linear siloxane compound comprise about 15% to about 50% of the molecular weight of the amine-terminated, substantially linear siloxane compound.

16. The product of claim 12, wherein the total number of siloxane repeating units in the amine-terminated, substantially linear siloxane compound is about 100 or less.

17. The product of claim 16, wherein the total number of siloxane repeating units in the amine-terminated, substantially linear siloxane compound is about 50 or less.

18. The product of claim 12, wherein the amine-terminated, substantially linear siloxane compound exhibits an amine hydrogen equivalent weight of about 8,000 g/eq. or less.

19. The product of claim 12, wherein $R_1$, $R_5$, $R_6$, $R_{12}$, and $R_{13}$ are selected from the group consisting of alkyl groups.

20. The product of claim 19, wherein $R_1$, $R_5$, $R_6$, $R_{12}$, and $R_{13}$ are methyl groups.

21. The product of claim 12, wherein $R_3$ is selected from the group consisting of aryl groups.

22. The product of claim 12, wherein $R_2$ is 2-methylethane-1,2-diyl, and $R_3$ is phenyl.

23. The product of claim 12, wherein $R_{10}$ is selected from the group consisting of hydrogen and aminoalkyl groups.

24. The product of claim 12, wherein the epoxy resin and the amine-terminated, substantially linear siloxane compound are reacted in a ratio of amine-terminated, substantially linear siloxane compound to epoxy resin of about 0.8:1 to about 1.2:1 based on the amine equivalents of amine-terminated, substantially linear siloxane compound and the epoxy equivalents of the epoxy resin.

25. The product of claim 12, wherein the epoxy resin and the amine-terminated, substantially linear siloxane compound are reacted in a ratio of amine-terminated, substantially linear siloxane compound to epoxy resin of about 0.5:1 or less based on the amine equivalents of the amine-terminated, substantially linear siloxane compound and the epoxy equivalents of the epoxy resin.

26. The product of claim 25, wherein the viscosity of the product is about 10,000 cP or less.

27. The product of claim 12, wherein the epoxy resin and the amine-terminated, substantially linear siloxane compound are reacted in a ratio of amine-terminated, substantially linear siloxane compound to epoxy resin of about 2:1 or more based on the amine equivalents of the amine-terminated, substantially linear siloxane compound and the epoxy equivalents of the epoxy resin.

28. The product of claim 27, wherein the viscosity of the product is about 10,000 cP or less.

29. A coated substrate comprising a substrate having a surface and a solid coating applied to at least a portion of the surface, the coating comprising the product of claim 12.

30. A product comprising a moiety conforming to the structure of Formula (L)

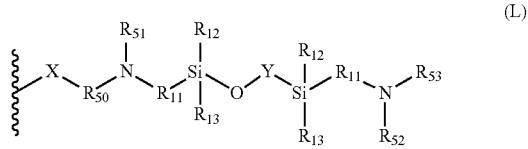

(L)

wherein X is a moiety derived from a group linking epoxide groups in an epoxy resin; $R_{11}$ is selected from the group consisting of alkanediyl groups and substituted alkanediyl groups; $R_{12}$ and $R_{13}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_{50}$ is a divalent group selected from the group consisting of —CH₂CH(OH)CH₂— and —CH₂CH(CH₂OH)—; $R_{51}$, $R_{52}$, and $R_{53}$ are independently selected from the group consisting of hydrogen, alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and —X—R₅₀—; Y is a substantially linear siloxane moiety comprising a plurality of siloxane repeating units wherein:

(a) a portion of the siloxane repeating units are independently selected from the group consisting of siloxane repeating units conforming to the structure of Formula (I)

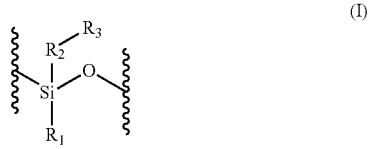

wherein $R_1$ is selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups; $R_2$ is selected from the group consisting of alkanediyl groups and alkenediyl groups; and $R_3$ is selected from the group consisting of aryl groups, substituted aryl groups, heteroaryl groups, and substituted heteroaryl groups; and (b) a portion of the siloxane repeating units are independently selected from the group consisting of siloxane repeating units conforming to the structure of Formula (V)

wherein $R_5$ and $R_6$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups.

31. The product of claim 30, wherein X is a moiety conforming to the structure of Formula (C)

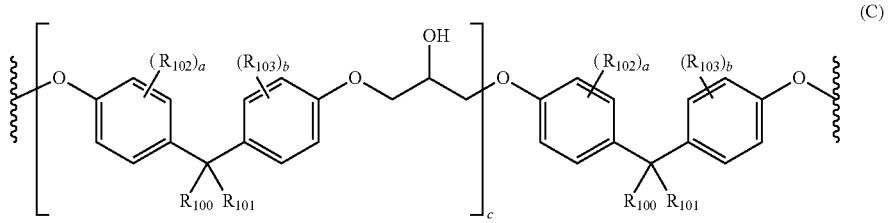

wherein $R_{100}$ and $R_{101}$ are independently selected from the group consisting of hydrogen, alkyl groups, haloalkyl groups, and aryl groups; $R_{102}$ and $R_{103}$ are independently selected from the group consisting of alkyl groups and aryl groups; a and b are independently selected from the group consisting of 0, 1, and 2; and c is selected from the group consisting of 0 and integers from 1 to 50.

32. The product of claim 30, wherein the siloxane repeating units conforming to the structure of Formula (I) comprise about 1% or more of the siloxane repeating units in the substantially linear siloxane moiety Y.

33. The product of claim 30, wherein the substantially linear siloxane moiety Y has a formula weight, and the siloxane repeating units conforming to the structure of Formula (I) in the substantially linear siloxane moiety comprise about 15% to about 50% of the formula weight of the substantially linear siloxane moiety.

34. The product of claim 30, wherein the total number of siloxane repeating units in the substantially linear siloxane moiety Y is about 100 or less.

35. The product of claim 34, wherein the total number of siloxane repeating units in the substantially linear siloxane moiety Y is about 50 or less.

36. The product of claim 30, wherein $R_1$, $R_5$, $R_6$, $R_{12}$, and $R_{13}$ are selected from the group consisting of alkyl groups.

37. The product of claim 36, wherein $R_1$, $R_5$, $R_6$, $R_{12}$, and $R_{13}$ are methyl groups.

38. The product of claim 30, wherein $R_3$ is selected from the group consisting of aryl groups.

39. The product of claim 30, wherein $R_2$ is 2-methylethane-1,2-diyl, and $R_3$ is phenyl.

40. The product of claim 30, wherein the product has a viscosity of about 10,000 cP or less.

41. A coated substrate comprising a substrate having a surface and a solid coating applied to at least a portion of the surface, the coating comprising the product of claim 30.

* * * * *